3,142,549
RESPIRATOR AND A DISPOSABLE PRE-FILTER
Paul A. Klusewitz, Reading, and Vernon F. Gongoll, Shillington, Pa., assignors to The Electric Storage Battery Company, Philadelphia, Pa.
Filed Oct. 31, 1961, Ser. No. 149,034
5 Claims. (Cl. 55—316)

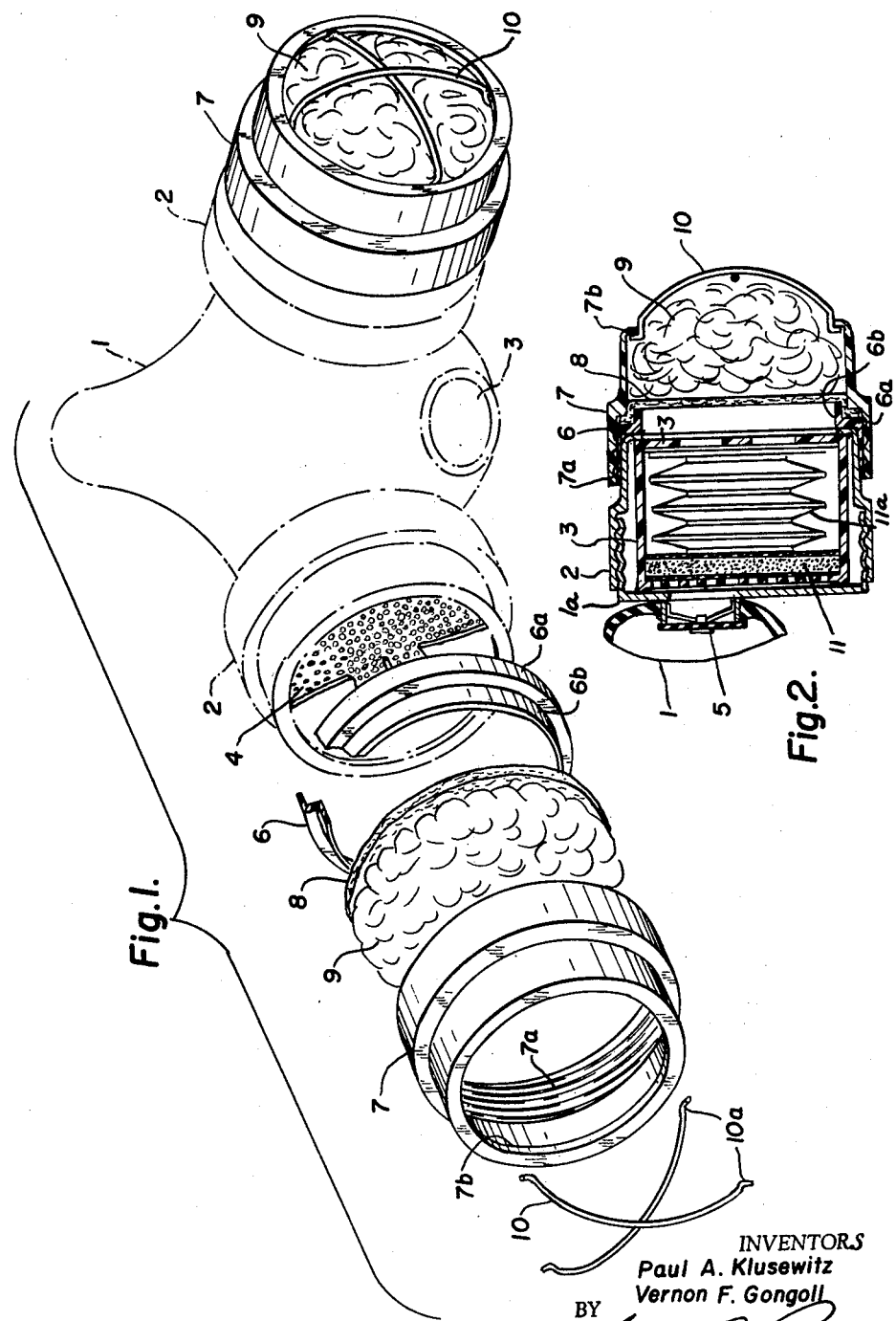

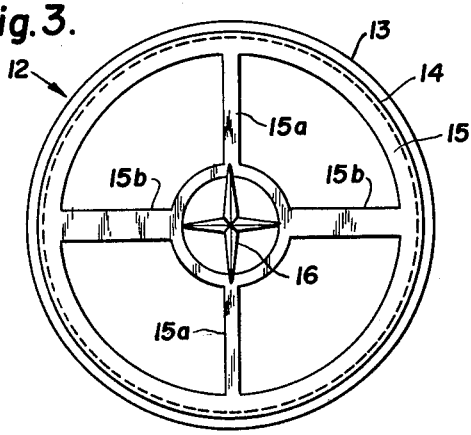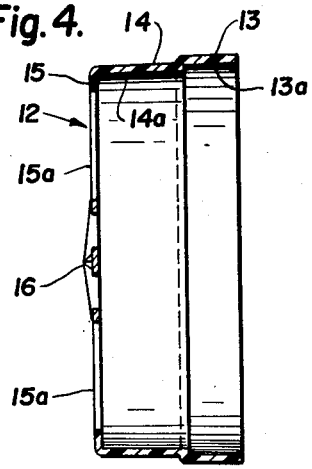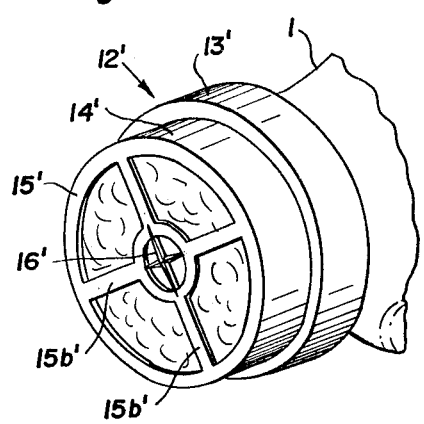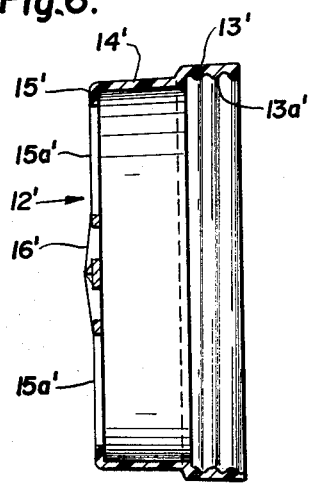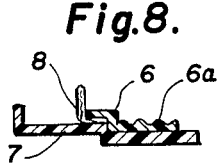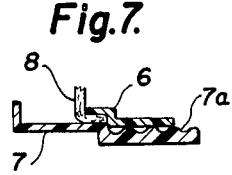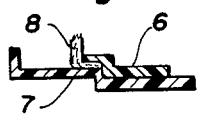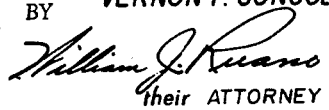

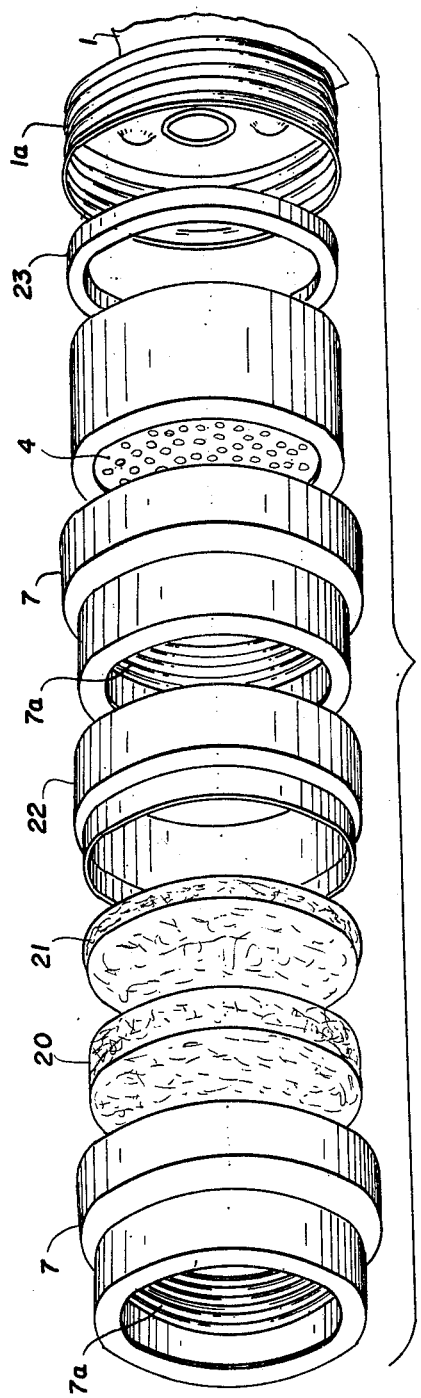
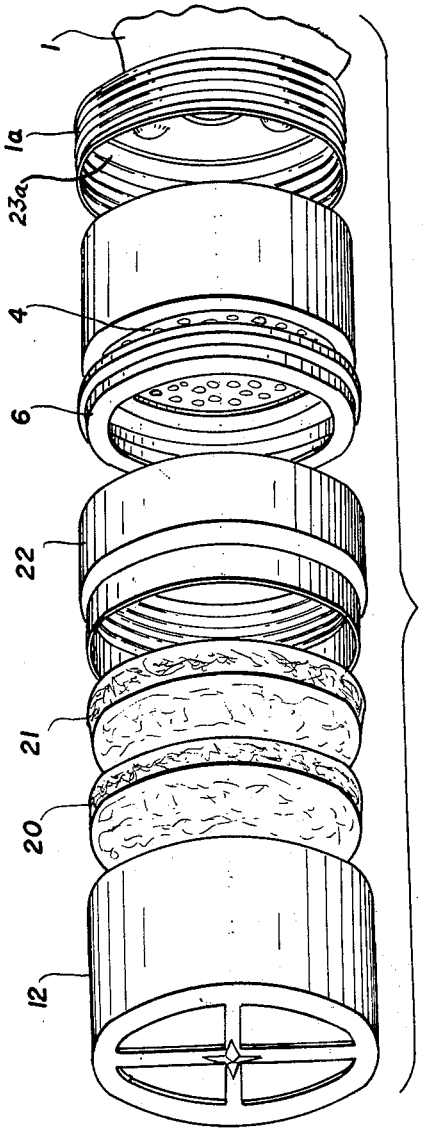
INVENTORS
PAUL A. KLUSEWITZ
VERNON F. GONGOLL
BY
*their* ATTORNEY United States Patent Office 3,142,549
Patented July 28, 1964

This invention relates to a respirator filter unit and, more particularly, to a disposable, pre-filter unit for attachment to a conventional respirator filter unit for absorbing the bulk of paint-spray or other air contaminants which would otherwise tend to rapidly clog the respirator filter.

An outstanding disadvantage of conventional respirator filter units, when used for spraying paint for protecting the wearer against the effects of such paint spray, is that the paint spray will either leak through in harmful amounts or will soon clog the pores of the filter unit, thus considerably increase breathing resistance and greatly shorten the life of the filter unit as compared to its life when used for filtering against ordinary dusts and/or organic vapors encountered in contemporary finishing methods.

An object of the present invention is to provide a novel respirator filter unit which is devoid of the above named disadvantages and which pertains to a disposable, pre-filter unit which will absorb the bulk of the paint spray or other air contaminants and thereby considerably prolong the life of the main filter or cartridge unit of the respirator far beyond its normal life.

A further object of the invention is to provide a novel disposable, pre-filter unit which may be easily and quickly attached to or detached from the casing of a conventional filter unit.

A still further object of the invention is to provide a disposable, pre-filter unit which is of such construction as to be easily slip-fitted to a conventional housing of a conventional filter unit without the necessity of making any modification whatsoever to the construction of the housing of the conventional filter unit.

Other objects and advantages will become more apparent from a study of the following description taken with the accompanying drawings wherein:

FIG. 1 is a front, elevational view showing a respirator and conventional filter retaining cup illustrated in dash and dot outline and to which is slip-fitted a disposable pre-filter unit, shown in full lines and embodying the present invention, the parts of which disposable unit are shown exploded at the left of FIG. 1 to more clearly illustrate the construction thereof;

FIG. 2 is a transverse, cross-sectional view of the pre-filter unit shown at the right of FIG. 1 but wherein a pleated main filter combined with a thin activated carbon layer is used instead of the organic vapor cartridge 4 of FIG. 1;

FIG. 3 is a front, elevational view of a modified form of cap;

FIG. 4 is a vertical cross-sectional view of the cap shown in FIG. 3;

FIG. 5 is a perspective view of a pre-filter assembly embodying the cap shown in FIGS. 3 and 4;

FIG. 6 is a cross-sectional view of a still further modification of the cap of FIGS. 3 and 4 including internal screw threads.

FIGS. 7 to 10 inclusive are fragmentary cross-sectional views, similar to FIG. 2 showing various modifications of detachable connections between the pre-filter assembly and filter unit;

Referring more particularly to FIG. 1 of the drawing, numeral 1 denotes a respirator which may be of rubber, plastic or other suitable flexible material of somewhat cup-shape and of pear-shaped outline. Attached to the two sides thereof are a pair of filter housings or cups 1a onto each of which is screwed a retaining cap 2. At the lower front portion of respirator 1 is an exhalation valve 3. The construction of the respirator so far described is conventional and well known in the art.

A main filter 4 is in the shape of a small chemical canister or cartridge of any suitable material which may be enclosed within the housing 1a and filter retaining cap 2, as shown at the left of FIG. 1. Outside air enters and flows through the chemical bed of the cartridge and filtered air is then inhaled through an inhalation valve 5. FIG. 2 shows a modified filter cartridge comprising a thin activated carbon layer 11 in series with a filter bellows 11a, both contained within a transparent plastic cartridge housing 3 to enable viewing of the condition of the filter. It will be noted that the cap 2 has a shoulder portion of reduced diameter which has an exterior smooth surface. The interior surface of the portion of larger diameter of cap 2 is threaded so as to be screw threaded onto an externally threaded housing 1a attached to the respirator.

In accordance with the present invention, a cap 7, of identical construction to cap 2, is provided so that no additional special cap will be required which would otherwise necessitate a special mold and additional cost. Cap 7, similar to cap 2, is internally threaded at 7a and has a radially inwardly extending end flange 7b, also it has a shoulder portion of reduced diameter. Caps 2 and 7 are made of any suitable plastic material, or of metal if so desired.

An insert ring 6 is provided which has a portion 6a of larger diameter which snugly fits within, or which may be sealed to, the threaded portion 7a of cap 7. Ring 6 has a shoulder portion 6b of reduced diameter which is smaller than the interior diameter of the shoulder portion of cap 7, being spaced from such interior diameter by a distance equal or slightly less than the thickness of filter disc 8 made of any suitable filtering material, such as felt or paper. Thus, filter disc 8, when sandwiched between cap 7 and insert 6, will be clamped along its peripheral portion to provide an offset peripheral joint, as shown, for tightly holding and sealing the periphery of the filter disc in place and under slight tension.

A pre-filter pad 9 may be in the form of a filtering material, such as cotton or loosely compacted paper, which may be formed with an outer protuberance or projection of substantially hemispherical shape to provide maximum air inlet surface area for collecting a substantial amount of paint spray or material suspended in the atmosphere which is to be filtered. Such outer hemispherical shape may be maintained and the loose pre-filter material may be prevented from pulling out by means of guards, such as spring elements 10 having stepped ends which may be manually pressed towards each other, to reduce their spacing, and then inserted behind flange 7b, so that when released, they will spring in place, as shown in FIG. 2. Other guard means may be used, instead, for maintaining the hemispherical shape of the external surface of the prefilter 9, such as wide mesh netting, similar to that used for making hair nets, or perhaps very wide mesh cloth, or perhaps merely a grid network of thin cords, or a grill forming an integral portion of the molded cap.

In operation, assume that the wearer is wearing an ordinary respirator, such as shown in dot and dash outline, having either cartridge filters 4 or a combined activated carbon layer 11 and bellows filters 11a as shown in FIG. 2, or any other suitable filter unit, but wishes to do some paint spraying, or wishes to enter some area heavy laden with dust, mist or fumes. He would merely grasp the pre-filter units, shown in full lines, and slip each onto the shoulder portion of reduced diameter of cap 2, as the result of which the pre-filter unit is held tightly in place solely by friction. Thereafter, contaminated air will pass through the hemispherical surface of the pre-filter pad 9 and will be lodged within the pores of the pre-filter material. And in view of the very porous nature and absorption characteristics of the pre-filter material, a substantial amount of paint spray will be absorbed thereby, without unduly reducing its filtering effectiveness. Following a number of paint spray operations, when the pre-filter pad 9 becomes fully saturated, the entire pre-filter unit, enclosed within the cap 7, is slid off cap 2 and discarded and a new pre-filter unit is slid or slip-fitted, in place thereof, on the shoulder of cap 2.

In some instances, if it is desired not to discard the cap 7, spring arms 10 may be sprung slightly towards each other to permit removal of the pre-filter pad 9 and replacement thereof with a new pad. If desired, no main filter 4 or 4a need be used in which instance filter disc 8 would serve as the main filter. Since the pre-filter 9 will absorb the bulk of the dust or paint spray material to be filtered, it will be readily apparent that the filter disc 8 will not have to absorb or retain any appreciable amount of dust or paint spray material, therefore will be maintained relatively clean for very long periods of time and have a life which is many fold the usual life in the event that no pre-filter were used.

The pre-filter combination shown in the drawings also permits separate strata of filtering material of progressively smaller pores so that pre-filter 9 will have the largest sizes of interstices, and filter disc 8 of smaller size (and perhaps filter 4a of even smaller size) whereby the air may be more effectively filtered so as to remove finer particles and more particles than heretofore possible.

FIGS. 3, 4 and 5 show a modified form of cap 15 which takes the place of the combined cap 7 and ring 6. That is, cap 15, which is made of any suitable material such as cellulose butyrate-acetate, is molded specially so as to have a portion 13 of larger diameter having a smooth internal surface 13a and having a shoulder portion of smaller diameter 14, also with a smooth internal surface 14a. The top 15 of the cap is in the form of a grill made up of radial strips 15a, and 15b together with a cross-like piece 16, all of which may be integrally molded with the cap. Although the grill is shown as flat, it could be bulged out similar to guard 10 of FIGS. 1 and 2 if so desired.

FIG. 6 shows a further modification of the cap shown in FIGS. 3, 4 and 5 wherein corresponding parts are indicated by the same numerals primed, for example, part 14' of FIG. 16 corresponds to 14 of FIG. 4 etc. The only difference is that internal surface 13a' is threaded instead of being smooth so that the cap may be screw threaded to the conventional external threads of the filter holding housing, such as shown in FIG. 2. The cap modification shown in FIG. 6, similar to that shown in FIG. 4 eliminates the necessity for the internal ring 6 shown in FIG. 1 and 2 and provides a special pre-filter cap to enable the pre-filter pad to be used either alone with pad 8 or in combination with pad 8 and filter 4 or 4a.

FIGS. 7 to 10 inclusive show various modifications of detachable connections between the pre-filter unit and main filter unit, such as shown in FIGS. 1, 2 and 5.

FIG. 11 is an exploded view showing a preferred assembly of main filter and pre-filter units. The main filter unit comprises a heavy gasket 23, a chemical cartridge filter 4, a cartridge retainer 7 having internal threads 7a which are screwed onto cup 1a attached to respirator 1 so as to hold the cartridge 4 in place.

A filter-locking ring 22 is adapted to be slip-fitted on the shoulder portion of reduced diameter of retainer 7. A final filter pad or disc 21 and a pre-filter pad or disc 20 are contained within a filter retainer or cap 7.

FIG. 12 is an exploded view showing a modified assembly of main filter and pre-filter units. The main filter unit comprises chemical cartridge 4, a cartridge adapter ring 6, a filter-retaining cap 22 and main filter disc or pad 21. The pre-filter unit comprises a pre-filter pad or disc 20 and a retainer housing 12. A thin rubber gasket 23a is provided in cup 1a.

Thus it will be seen that we have provided an efficient, disposable pre-filter attachment which is highly useful for filtering and absorbing dust, mist, fumes or paint sprays of highly contaminated atmospheres, whereby the main filter will be protected against abnormal absorption or retentation of such material which would otherwise considerably reduce its effectiveness and life; furthermore, we have provided a pre-filter attachment which is so constructed as to use exactly the same shape of cap as used for the main respirator, and which can be easily and quickly attached to or detached from the respirator cap by means of a slip-fit; furthermore, we have provided a pre-filter unit which is made of relatively simple and inexpensive parts and which is so shaped as to provide maximum air inlet surface area so as to absorb a maximum amount of air contaminating material.

While we have illustrated and described several specific embodiments of our invention, it will be understood that these are by way of illustration only, and that various changes and modifications may be made within the contemplation of our invention and within the scope of the following claims.

I claim:

1. In combination with a respirator having an inhalation valve, a screw threaded cup attached to said respirator and having a hole in communication with said valve, a main filter cartridge contained within said cup, a cap screw threaded to said cup so as to form an air-tight seal between said cup and cartridge, said cap being opened at the top and having an outer end portion of reduced diameter, a second cap being opened at the top and having a mouth portion detachably fitted to said portion of reduced diameter, a sealing ring between said portions, a filter pad extending across an inner, intermediate portion of said second cap, and a body of loose, fibrous filtering material supported by said filter pad to form a pre-filter and extending to the outer end portion of said second cap, whereby said second cap and the enclosed pre-filter are readily disposable after absorbing vapor mist without affecting said air-tight seal.

2. Apparatus recited in claim 1 wherein said main filter includes a chemical cartridge filter and wherein said second cap is slip-fitted to said end portion of reduced diameter.

3. Apparatus as recited in claim 1 wherein said body of loose, fibrous filtering material has a convex outer end surface supported by a corresponding curved guard wire means for providing maximum inlet surface area.

4. Apparatus as recited in claim 1 wherein said cap and second cap are of identical construction so as to be interchangeable.

5. Apparatus as recited in claim 1 wherein said main filter cartridge comprises a transparent plastic container enclosing a layer of activated carbon in series with a bellows filter, the inner end wall of said container having a plurality of openings for providing communication between said valve and activated carbon layer, said container having a perforated outer end wall providing air communication between said bellows filter and said filter pad.

References Cited in the file of this patent

UNITED STATES PATENTS

| | | |
|---|---|---|
| 2,062,834 | Schwartz | Dec. 1, 1936 |
| 2,264,829 | Cover | Dec. 2, 1941 |
| 2,614,830 | Mitchell | Oct. 21, 1952 |
| 2,652,828 | Matheson | Sept. 22, 1953 |
| 2,744,523 | Malcolm et al. | May 8, 1956 |
| 2,787,333 | Boone et al. | Apr. 2, 1957 |
| 2,798,718 | Gross | July 9, 1957 |
| 2,993,564 | Rodenhouse | July 25, 1961 |

FOREIGN PATENTS

| | | |
|---|---|---|
| 474,823 | Great Britain | 1937 |